(12) United States Patent
Lighty et al.

(10) Patent No.: US 12,736,010 B2
(45) Date of Patent: Sep. 15, 2026

(54) BLEED VALVE ASSEMBLY WITH VALVE SEAL FOR GAS TURBINE ENGINE COMPRESSORS

(71) Applicant: Rolls-Royce North American Technologies Inc., Indianapolis, IN (US)

(72) Inventors: Kerry J. Lighty, Indianapolis, IN (US); Steven Mazur, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 144 days.

(21) Appl. No.: 18/640,402

(22) Filed: Apr. 19, 2024

(65) Prior Publication Data

US 2025/0389229 A1 Dec. 25, 2025

(51) Int. Cl.
*F02C 9/18* (2006.01)

(52) U.S. Cl.
CPC ..................................... *F02C 9/18* (2013.01)

(58) Field of Classification Search
CPC ......................................................... F02C 9/18
See application file for complete search history.

(56) References Cited

U.S. PATENT DOCUMENTS 3,945,390 A * 3/1976 Huber ........................ F16K 1/34 251/210
4,412,782 A 11/1983 Monsarrat
6,122,905 A * 9/2000 Liu ....................... F04D 27/023 60/785
7,540,144 B2 * 6/2009 Makuszewski ....... F04D 27/023 60/785
11,193,427 B2 * 12/2021 Kelly ........................ F02C 9/18
11,506,132 B1 11/2022 Duranleau-Hendrickx
2007/0234738 A1 * 10/2007 Borcea ...................... F02C 9/18 60/785
2015/0242688 A1 8/2015 Knight et al.
2017/0101937 A1 * 4/2017 Schlarman ............ F16K 15/026
2017/0356348 A1 12/2017 Ribarov
2019/0001372 A1 1/2019 Crawford
2019/0055889 A1 2/2019 Heims

* cited by examiner

*Primary Examiner* — Patrick C Williams
(74) *Attorney, Agent, or Firm* — Barnes & Thornburg

(57) ABSTRACT

A bleed valve assembly includes a manifold coupled to a case of a compressor of a gas turbine engine to control a flow of bleed air exiting the compressor, a valve housing coupled with the manifold, a piston configured to move selectively relative to the valve housing and the manifold, and a valve seal configured to block bleed air from passing between the piston and the manifold when the piston is in a closed position.

5 Claims, 4 Drawing Sheets

220
224
215
230
241
254
230
241
226
227
240
240
233
231
228
229
226
238
222
234
236
232
219
COMPRESSOR CASE
219
COMPRESSOR CASE 220
224
215
241
241
254
230
230
226
240
227
240
238
222
228
236
232
229
226
219
COMPRESSOR CASE
219
COMPRESSOR CASE

BLEED VALVE ASSEMBLY WITH VALVE SEAL FOR GAS TURBINE ENGINE COMPRESSORS

STATEMENT REGARDING FEDERALLY SPONSORED RESEARCH OR DEVELOPMENT

Embodiments of the present disclosure were made with government support under Contract No. HQ0034-20-9-0012. The government may have certain rights.

FIELD OF THE DISCLOSURE

The present disclosure relates generally to turbine engines with a compressor, and more specifically, to bleed valve assemblies for compressors.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Bleed valve assemblies are used to control and manage excess air produced by the compressor. During engine start up, bleed valve assemblies are typically opened to allow the excess air or bleed air to exit the compressor. During high power running of the gas turbine engine, bleed valve assemblies are typically closed to block air from exiting the compressor via the bleed valve assembly. Typical bleed valve assemblies may include a manifold defining an air passageway through which bleed air can exit the compressor when the air passageway is open and a piston that closes the air passageway to block air from exiting the compressor. In these assemblies, tolerances and unevenness at the interface between the piston and the manifold may allow air to leak between the piston and the manifold when the bleed valve assembly is closed, impacting engine performance. Accordingly, it is desired to prevent such leakage from occurring when the bleed valve assembly is closed.

Additionally, when the bleed valve assembly is opened, the bleed air exits the compressor at a fixed flow rate. The flow rate is impacted by the size of the gap between the piston and the manifold. Accordingly, it may be desired to vary the size of the gap to adjust the flow rate.

SUMMARY

The present disclosure may comprise one or more of the following features and combinations thereof.

A bleed valve assembly for a gas turbine engine according to the present disclosure may comprise a manifold coupled to a case of the compressor of the gas turbine engine to control a flow of bleed air exiting the compressor, a valve housing coupled with the manifold and configured to receive pressurized air, a piston received in the valve housing, and a valve seal coupled with the manifold.

The manifold may include an outer surface defining an air passageway formed in the manifold for the bleed air to exit the compressor through the manifold. The air passageway may define a central axis of the bleed valve assembly. The piston may be configured to move selectively relative to the valve housing and the manifold in response to the valve housing receiving the pressurized air to close the air passageway of the manifold. The valve seal may be arranged around the air passageway and may be configured to compress axially between the piston and the outer surface of the manifold in response to the piston moving axially downward to a closed position to provide a seal between the piston and the manifold so that the bleed air is blocked from flowing between the piston and the outer surface of the manifold.

In some embodiments, the valve seal may comprise sheet metal configured to conform to a bottom surface of the piston and the outer surface of the manifold when the piston is in the closed position. In some embodiments, the valve seal may have a radial length that is greater than a radial length of a bottom surface of the piston.

In some embodiments, the manifold may further include an intermediate surface spaced axially downward from the outer surface and an axially-extending wall interconnecting the outer surface and intermediate surface. In some embodiments, the valve seal may be arranged to extend along the outer surface, the axially-extending wall, and the intermediate surface.

In some embodiments, the bleed valve assembly may further include at least one fastener that couples the valve housing to the outer surface of the manifold. In some embodiments, the valve seal may be formed to include a raised ridge portion that extends away from at least a portion of the manifold in response to the piston being in the open position and compresses toward the manifold in response to the piston being in the closed position and the piston applying a force to the raised ridge portion. In some embodiment, the bleed valve assembly may further comprise an air collector arranged axially between the housing mount and the manifold to collect the bleed air that exits through the air passageway when the piston is in the open position.

According to another aspect of the present disclosure, a bleed valve assembly for a gas turbine engine, the bleed valve assembly may comprise a manifold coupled to a case of a compressor of the gas turbine engine to control a flow of bleed air exiting the compressor, a valve housing coupled with the manifold and configured to receive pressurized air, a piston received in the valve housing, and a valve housing coupled between portions of the piston.

The manifold may include an outer surface defining an air passageway formed in the manifold for the bleed air to exit the compressor through the manifold. The air passageway may define a central axis of the bleed valve assembly. The piston may be configured to move selectively relative to the valve housing and the manifold in response to the valve housing receiving the pressurized air to close the air passageway of the manifold. The piston may include a main body and a plug coupled to the main body. The plug may be configured to extend into the air passageway when the piston closes the air passageway.

The valve seal may be coupled between a lower surface of the main body and an upper surface of the plug. The valve seal may be configured to compress axially between the main body and the outer surface of the manifold in response to the piston moving axially downward to a closed position to provide a seal between the main body and the manifold so that the bleed air is blocked from flowing between the main body and the outer surface of the manifold.

These and other features of the present disclosure will become more apparent from the following description of the illustrative embodiments.

DETAILED DESCRIPTION OF THE DRAWINGS

Figure 1:
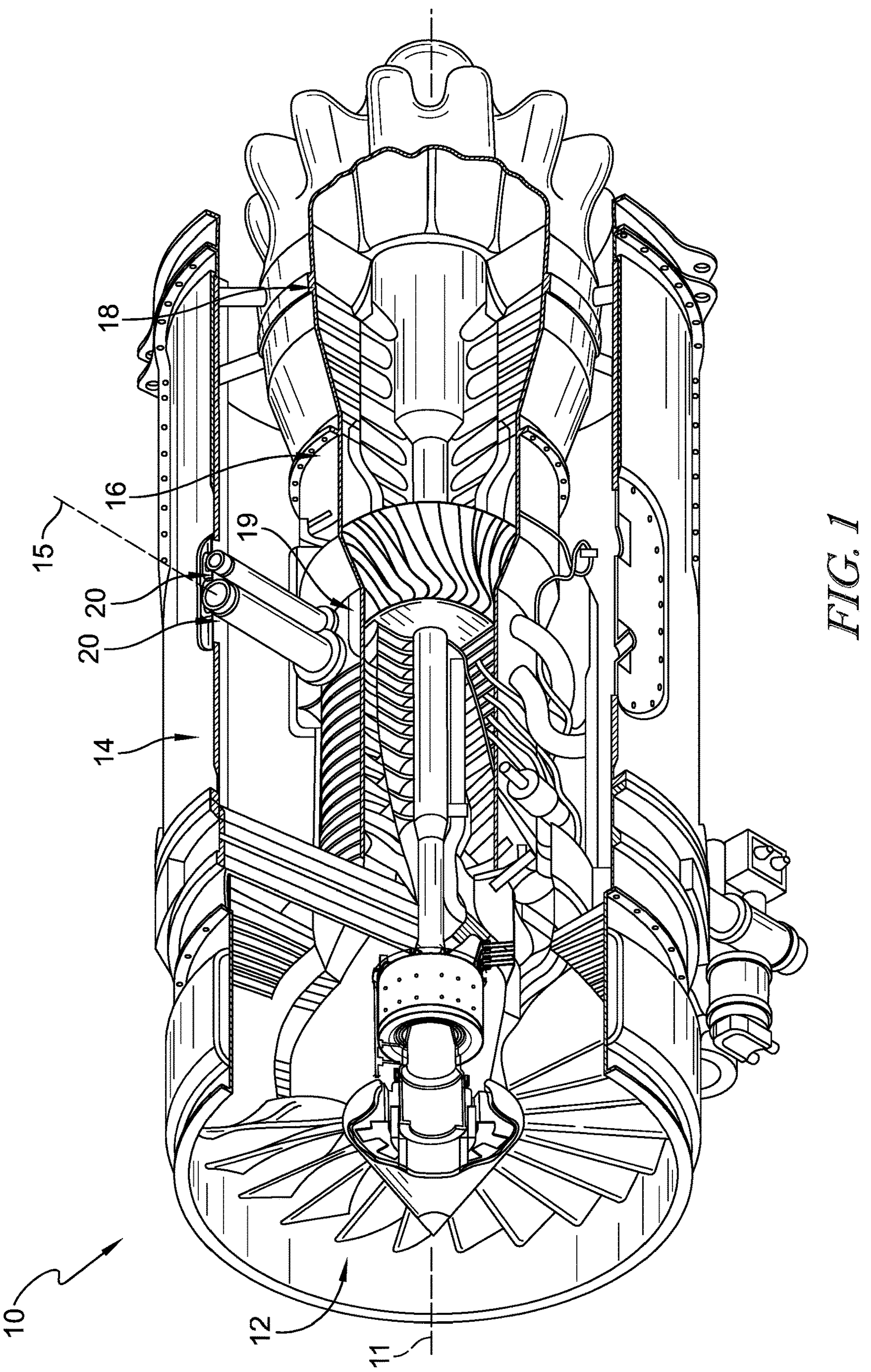
FIG. 1 is a schematic and cut-away view of a gas turbine engine comprising a fan, a compressor, a combustor, and a turbine, and showing the compressor includes a bleed valve assembly for regulating airflow bled from the compressor.

For the purposes of promoting an understanding of the principles of the disclosure, reference will now be made to a number of illustrative embodiments illustrated in the drawings and specific language will be used to describe the same.

An illustrative gas turbine engine 10 includes a fan 12, a compressor 14, a combustor 16 fluidly coupled to the compressor 14, and a turbine 18 fluidly coupled to the combustor 16 as shown in FIG. 1. The fan 12 provides thrust for propelling an aircraft. The compressor 14 compresses and delivers air to the combustor 16. The compressor includes a case 19 arranged circumferentially about relative to an axis 11 of the gas turbine engine 10. The combustor 16 mixes fuel with the compressed air received from the compressor 14 and ignites the fuel. The hot, high pressure products of the combustion reaction in the combustor 16 are directed into the turbine 18 to cause the turbine 18 to rotate about the axis 11 and drive the compressor 14 and the fan 12.

The gas turbine engine 10 further includes one or more bleed valve assemblies 20 that selectively allow an excess airflow or bleed air 13 to exit the compressor 14 as shown in FIGS. 2-5. For example, the bleed air 13 may exit the compressor 14 during engine 10 startup and may be blocked from exiting the compressor 14 when the engine 10 is running in high power. The bleed air 13 may be used to pressurize a cabin of an aircraft, cool turbine components, be expelled to atmosphere, etc.

The bleed valve assembly 20 includes a manifold 22, a valve housing 24, a piston 26, a valve seal 28, and may include one or more shims 30 as shown in FIGS. 2-5. The manifold 22 is configured to define an air passageway 32 for the bleed air 13 to exit the compressor 14. The air passageway 32 defines a central axis 15 of the bleed valve assembly 20 that extends radially relative to the axis 11 of the gas turbine engine 10. The valve housing 24 is configured to receive pressurized air 17 to close the air passageway 32. The piston 26 is configured to move selectively relative to the valve housing 24 and the manifold 22 in response to the valve housing 24 receiving the pressurized air 17 to close the air passageway 32. The valve seal 28 is configured to compress axially between the piston 26 and the manifold 22 in response to the piston 26 moving axially downward to a closed position to provide a seal between the piston 26 and the manifold 22 so that the bleed air 13 is blocked from flowing between the piston 26 and the manifold 22. The one or more shims 30 may be used, as an example, during testing of the compressor 14 and are configured to define an axial distance between a lower surface 48 of the piston 26 and an outer surface 34 of the manifold 22 to control a flow rate of the bleed air 13 exiting the compressor 14 through the bleed valve assembly 20 when the piston 26 is in an open position.

Figures 2, 3:
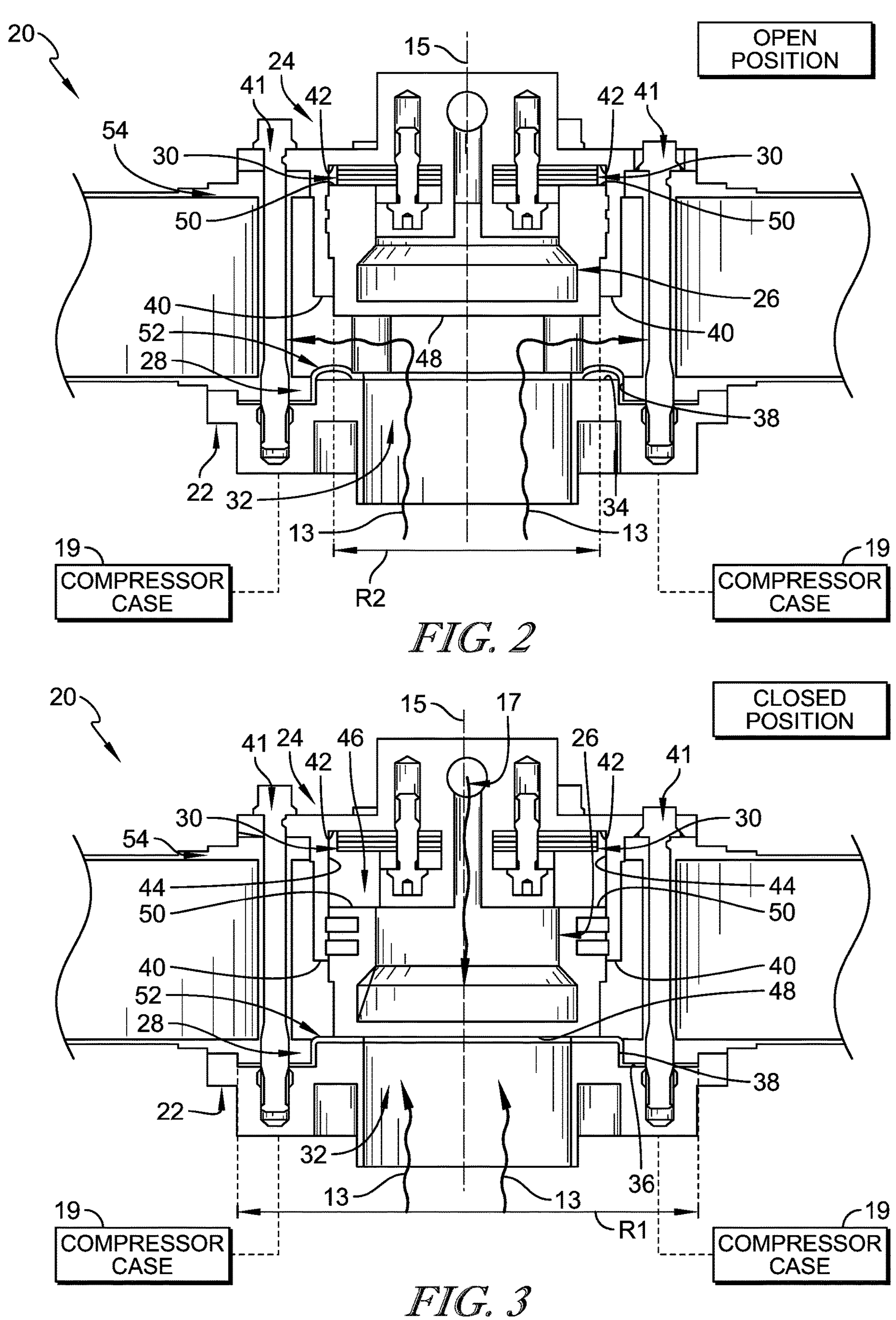
FIG. 2 is a section view of the bleed valve assembly of FIG. 1 showing that the bleed valve assembly includes a valve housing coupled to an outer case of the compressor, a manifold forming an air passageway for the bleed air exiting the compressor, a piston coupled to the valve housing and in an open position to allow the bleed air to exit the air passageway, and a valve seal coupled with the manifold.
FIG. 3 is a section view of the bleed valve assembly of FIG. 2 showing the piston in a closed position to block the bleed air from exiting the air passageway and showing that the valve seal is compressed radially between the piston and the manifold to provide a seal between the piston and the manifold.

As shown in FIGS. 2 and 3, the manifold 22 is coupled to the case 19 of the compressor 14 such that the bleed valve assembly 20 extends radially outward from the case 19 relative to the axis 11. The manifold 22 controls a flow of bleed air 13 exiting the compressor 14. The manifold 22 includes the outer surface 34, an intermediate surface 36, and an axially-extending wall 38. The outer surface 34 defines the air passageway 32. The intermediate surface 36 is spaced axially downward from the outer surface 34. The axially-extending wall 38 interconnects the outer surface 34 and the inner surface 36.

The valve housing 24, in the illustrative embodiment, is coupled with the manifold 22 via fasteners 41 as shown in FIGS. 2-5. The valve housing 24 includes a lower surface 40, and inner surface 42, and an axially-extending wall 44. The lower surface 40 is spaced an axial distance 40D from the outer surface 34 of the manifold 22. The inner surface 42 is spaced axially upward from the lower surface 40. The axially-extending wall 44 interconnects the inner surface 42 and the outer surface 34 of the manifold 22. The axially-extending wall 44 and the inner surface 42 cooperate to define a pathway 46 for the piston 26.

The piston 26 is received in the pathway 46 of the valve housing 24 as shown in FIGS. 2-5. The piston 26 includes a lower surface 48 and an upper surface 50 spaced apart axially upward from the lower surface 48. The piston 26 is movable between an open position, as shown in FIG. 2, in which the lower surface 48 is spaced apart from the outer surface 34 of the manifold 22 to open the air passageway 32 and a closed position, shown in FIG. 3, in which the lower surface 48 engages the valve seal 28 to close the air passageway 32. The piston 26 moves axially downward to the closed position in response to the valve housing 24 receiving the pressurized air 17. The piston 26 moves axially upward to the open position in response to the pressurized air 17 being relieved and the bleed air 13 from the compressor 14 forcing the piston 26 upward.

The valve seal 28 is coupled with the manifold 22 and is arranged around the air passageway 32 as shown in FIGS. 2-5. The valve seal 28 compresses axially between the lower surface 48 of the piston 26 and the outer surface 34 of the manifold 22 when the piston 26 is in the closed position to provide a seal between the piston 26 and the manifold 22. In other words, the valve seal 28 conforms to the lower surface 48 of the piston 26 and the outer surface 34 of the manifold 22 when the piston 26 is in the closed position. Accordingly, the bleed air 13 is blocked from flowing between the piston 26 and the outer surface 34 of the manifold 22 when the piston 26 is in the closed position. The valve seal 28 comprises sheet metal. In other embodiments, the valve seal 28 may comprise any material which allows the valve seal 28 to conform to the lower surface 48 of the piston 26 and the outer surface 34 of the manifold 22.

The valve seal 28 has a radial length R1 that is greater than a radial length R2 of the lower surface 48 of the piston 26 as shown in FIGS. 2-3. As such, when the piston 26 is moved to the closed position, the lower surface 48 of the piston 26 pushes the valve seal 28 radially outward relative to the central axis 15. The valve seal 28 is arranged to extend along the outer surface 34, the axially-extending wall 38, and the intermediate surface 36 of the manifold 22. The valve seal 28 is formed to include a raised ridge portion 52. When the piston 26 is in the closed position, the raised ridge portion 52 extends axially away from the outer surface 34 of the manifold 22. The raised ridge portion 52 compresses axially downward towards the outer surface 34 of the manifold 22 and extends radially away from the axially-extending wall 38 of the manifold 22 in response to the piston 26 being in the closed position and the piston 26 applying a force to the raised ridge portion 52.

Figures 4, 5:
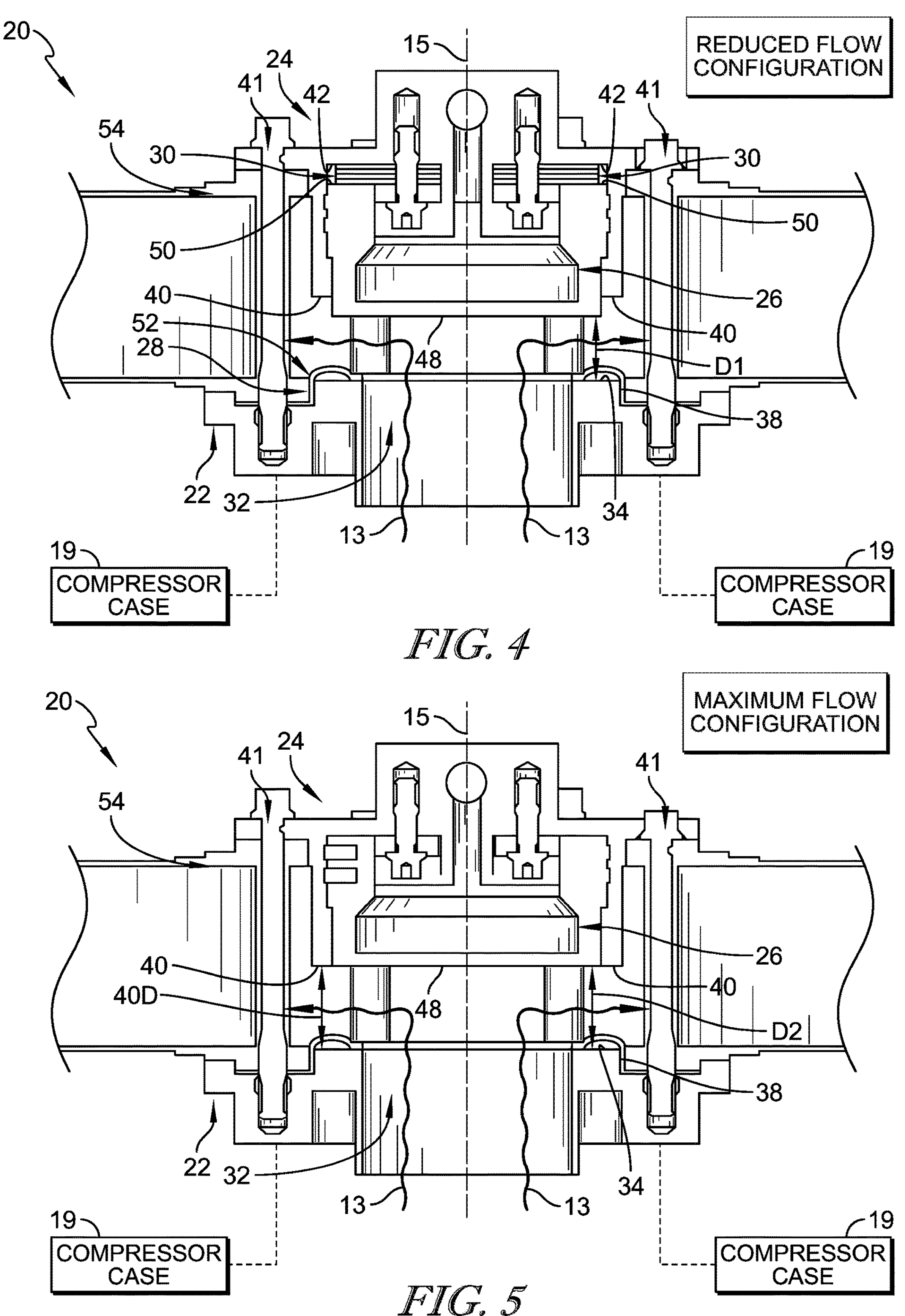
FIG. 4 is a section view of the bleed valve assembly of FIG. 2 showing that the bleed valve assembly further includes one or more shims arranged axially between an outer surface of the piston and an inner surface of the valve housing, the one or more shims, the valve housing, and the piston cooperating to define a first radial distance between an inner surface of the piston and an outer surface of the manifold when the bleed valve is in the open position to allow the bleed air to pass through the bleed valve assembly at a first predetermined rate.
FIG. 5 is a section view of the bleed valve assembly of FIG. 4 showing the one or more shims removed from the bleed valve assembly such that the outer surface of the piston engages the inner surface of the valve housing, the valve housing and the piston cooperating to define a second radial distance between the inner surface of the piston and the outer surface of the manifold that is greater than the first radial distance when the bleed valve is in the open position to allow the bleed air to pass through the bleed valve assembly at a second predetermined rate that is greater than the first predetermined rate.

During testing, for example, the one or more shims 30 may be arranged between the inner surface 42 of the valve housing 24 and the upper surface 50 of the piston 26 to define an axial distance between the lower surface 48 of the piston 26 and the outer surface 34 of the manifold 22 as shown in FIGS. 2-4. The one or more shims 30 may be four shims 30 or less in some embodiments. In other embodiments, the one or more shims may be more than 4 shims. Each of the one or more shims 30 have the same axial height so that the axial distance between the lower surface 48 of the piston 26 and the outer surface 34 of the manifold 22 can be changed in equal increments. In other words, an axial height a first shim of the one or more shims 30 is equal to an axial height of a second shim of the one or more shims 30.

The bleed valve assembly 20 may be changeable between a reduced-flow configuration, a maximum-flow configuration, and at least one intermediate-flow configuration. In some embodiments, the bleed valve assembly 20 may only be changeable between the reduced-flow configuration and the maximum-flow configuration. The different configurations correspond with a different rate that the bleed air 13 passes through the bleed valve assembly 20. Therefore, the bleed valve assembly 20 is changed between the different configurations to change the rate that the bleed air 13 passes through the bleed valve assembly 20.

In the reduced-flow configuration, the one or more shims 30 are arranged axially between the upper surface 50 of the piston 26 and the inner surface 48 of the valve housing 24 as shown in FIG. 4. The bottom surface 48 of the piston 26 is spaced a first axial distance D1 from the outer surface 34 of the manifold 22 when the piston 26 is in the open position so that the bleed air 13 passes through the bleed valve assembly 20 at a first predetermined rate. The first axial distance D1 may be less than the axial distance 40D between the lower surface 40 of the valve housing 24 and the outer surface 34 of the manifold 22 so that the lower surface 48 of the piston 26 is axially downward from the lower surface 40 of the valve housing 24.

In the maximum-flow configuration, the one or more shims 30 are removed from the bleed valve assembly 20 such that the upper surface 50 of the piston 26 engages the inner surface 42 of the valve housing 24 when the piston 26 is in the open position as shown in FIG. 5. The bottom surface 48 of the piston 26 is spaced a second axial distance D2 from the outer surface 34 of the manifold 22 when the piston 26 is in the open position so that the bleed air 13 passes through the bleed valve assembly 20 at a second predetermined rate. The second axial distance D2 is greater than the first axial distance D1. The second axial distance D2 may be equal to the axial distance 40D between the lower surface 40 of the valve housing 24 and the outer surface 34 of the manifold 22 so that the lower surface 48 of the piston 26 is flush with the lower surface 40 of the valve housing 24 when the piston 26 is in the open position.

In the at least one intermediate-flow configuration (not shown), at least one of the one or more shims 30 is located axially between the upper surface 50 of the piston 26 and the inner surface 42 of the valve housing 24. For example, if the one or more shims 30 is four shims 30, then one, two, or three shims 30 may be located axially between the upper surface 50 of the piston 26 and the inner surface 42 of the valve housing 24 when the bleed valve assembly 20 is in the at least one intermediate-flow configuration. The bottom surface 48 of the piston 26 is spaced an axial distance from the outer surface 34 of the manifold 22 when the bleed valve is in the open position that is greater than the first axial distance D1 and less than the second axial distance D2. As such, the bleed air 13 passes through the bleed valve assembly at a rate that is greater than the first predetermined rate and less than the second predetermined rate. After testing of the bleed valve assembly 20, the radial height of the shims 30 may be used to design a fixed height piston feature of the commercial embodiment that does not use removable shims. Such embodiments may further include the valve seal 28.

As shown in FIGS. 2 and 4-5, the bleed valve assembly 20 includes an air collector 54 arranged axially between the valve housing 24 and the manifold 22. The air collector 54 collects the bleed air 13 that exits through the manifold 22 when the piston 26 is in the open position.

Figures 6, 7:
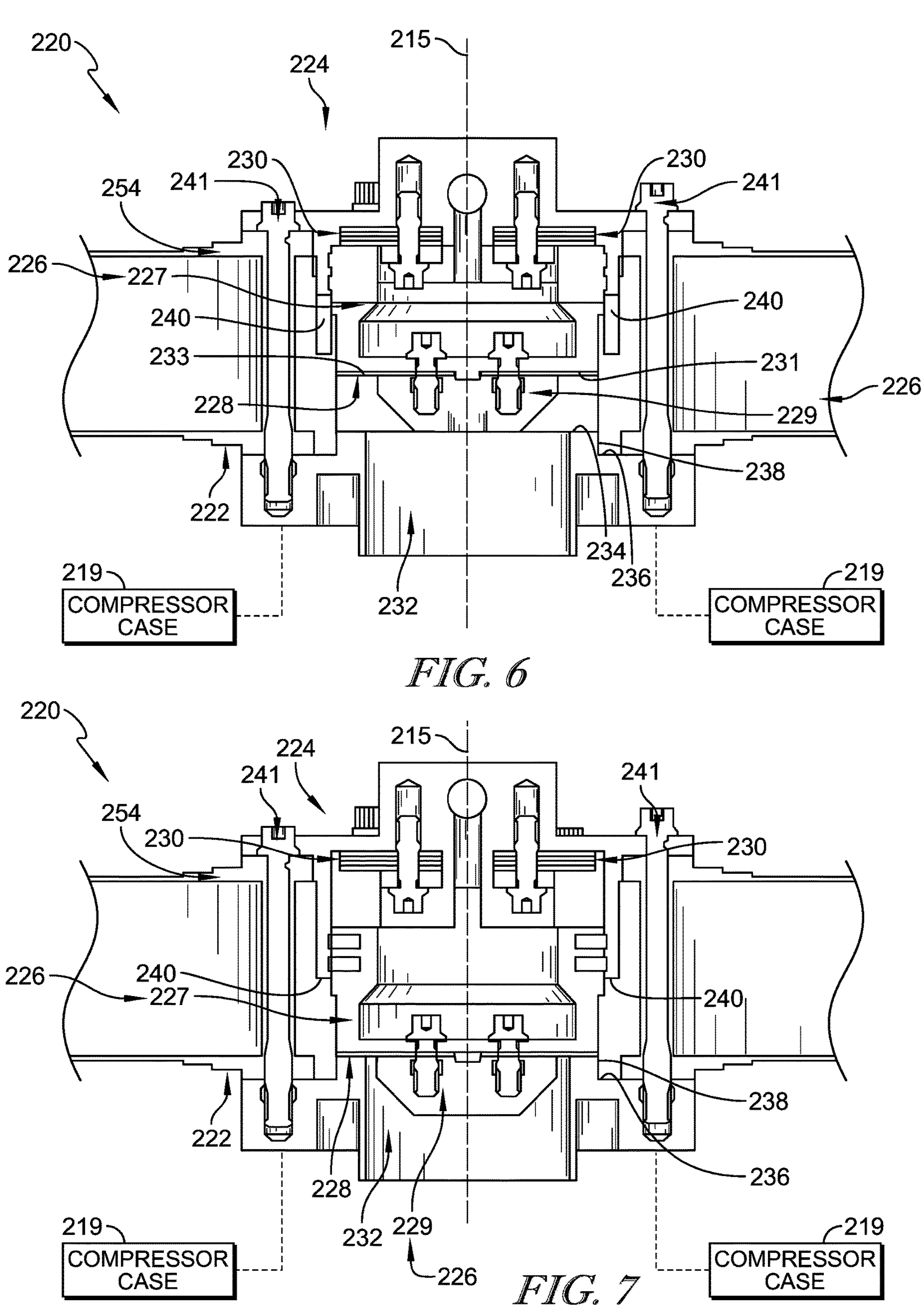
FIG. 6 is a section view of another embodiment of the bleed valve assembly of FIG. 1 showing a valve seal that is coupled to the piston and showing the piston in the open position.
FIG. 7 is a section view of the bleed valve assembly of FIG. 6 showing the piston in the closed position.

Another embodiment of the bleed valve assembly 220 for use in a gas turbine engine 10 in accordance with the present disclosure is shown in FIGS. 6-7. The bleed valve assembly 220 is substantially similar to the to the bleed valve assembly 20 shown in FIGS. 2-5. Accordingly, similar reference numbers indicate features that are common between the bleed valve assembly 20 and the bleed valve assembly 220. The description of the bleed valve assembly 20 is incorporated by reference to apply to the bleed valve assembly 220, except in instances when it conflicts with the specific description and the drawings of the bleed valve assembly 220.

The bleed valve assembly 220 includes a manifold 222, a valve housing 224, a piston 226, and a valve seal 228 as shown in FIGS. 6-7. The piston 226 includes a main body 227 and a plug 229 coupled to the main body 227. The plug 229 is configured to extend into an air passageway 232 formed in the manifold 222 when the piston 226 is in a closed position.

The valve seal 228 is coupled between a lower surface 231 of the main body 227 and an upper surface 233 of the plug 229 as shown in FIGS. 6-7. The valve seal 228 compresses axially between the main body 227 and an outer surface 234 of the manifold 222 in response to the piston 226 moving axially downward to the closed position to provide a seal between the main body 227 and the manifold 222. Accordingly, bleed air 13 is blocked from flowing between the main body 227 and the outer surface 234 of the manifold 222.

The present disclosure also includes a method for operating the bleed valve assembly 20 as suggested in FIGS. 4-5. The method includes providing the bleed valve assembly 20 as described herein and locating the one or more shims 30, 230 between the upper surface 50 of the piston 26 and the inner surface 42 of the valve housing 24. The method also includes moving the piston 26 to the open position in which the upper surface 50 of the piston 26 engages the one or more shims 30 and the bottom surface 48 of the piston 26 is spaced the first axial distance D1 apart from the outer surface 34 of the manifold 22 so that the bleed air 13 exiting the compressor 14 exits the compressor 14 at the first predetermined rate.

The method further includes removing at least one shim of the one or more shims 30 from between the upper surface 50 of the piston 26 and the inner surface 42 of the valve housing 24. The method then includes moving the piston 26 to the open position in which the upper surface 50 of the piston 26 engages the one or more shims 30 and the bottom surface 48 of the piston 26 is spaced an axial distance apart from the outer surface 34 of the manifold 22 that is greater than the first axial distance D1 so that the bleed air 13 exiting the compressor 14 exits the compressor 14 at a rate that is greater than the first predetermined rate.

The method may further include removing the one or more shims 30 from between the upper surface 50 of the piston 26 and the inner surface 42 of the valve housing 24 as shown in FIG. 5. Additionally, the method may further include moving the piston 26 to the open position in which the upper surface 50 of the piston 26 engages the inner surface 42 of the valve housing 24 and the bottom surface 48 of the piston 26 is spaced the second axial distance D2 apart from the outer surface 34 of the manifold 22 so that the bleed air 13 exiting the compressor 14 exits the compressor at the second predetermined rate.

It may be desirable to minimize leakage at the sealing interface between the piston 26, 226 and the manifold 22, 222 because air loss impacts engine performance. High pressure air or bleed air 13 from the compressor 14 flows through the manifold 22, 222 to force the piston 26, 226 to the open position. To close the air passageway 32, 232, pressurized air 17 connected to the valve housing 24, 224 forces the piston 26, 226 to the closed position. The air passageway 32, 232 is typically open during engine start up and closed during high power running.

The air collector 54, 254 is coupled between the valve housing 24, 224 and the manifold 22, 222 to provide alignment and perpendicularity between the valve housing 24, 224 and the manifold 22, 222. However, without the valve seal 28, 228, leakage may occur between the manifold 22, 222 and the piston 26, 226 when the piston 26, 226 is in the closed position. The valve seal 28, 228 provides a seal between the piston 26, 226 and the manifold 22, 222 when the piston 26, 226 is in the closed position to reduce air leakage. The valve seal 28, 228 comprises sheet metal to provide compliancy of the valve seal 28, 228 between the piston 26, 226 and the manifold 22, 222 while withstanding against the high temperature of bleed air 13. The outer surface 34, 234, the intermediate surface 36, 236, and the axially-extending wall 38, 238 of the manifold 22, 222 cooperate to form a step which increases the compliancy of the valve seal 28, 228 by allowing the valve seal 28, 228 to extend radially outward in response to the force from the piston 26, 226 when it is moved to the closed position.

It may also be desirable to be able to adjust the gap between the piston 26, 226 and the manifold 22, 222 in order to allow bleed air 13 to exit the manifold 22, 222 when the air passageway 32, 232 is open at a desired flow rate. The one or more shims 30, 230 allow for the height of the gap to be adjusted accordingly to control the flow rate of the bleed air 13 exiting the compressor 14. For example, the height of the gap may be adjusted while testing the gas turbine engine. Removing all of the one or more shims 30, 230 allows the bleed air 13 to exit the compressor 14 at a maximum flow rate. If a lower flow rate is needed, then one or more of the one or more shims 30, 230 can be added between the upper surface 50, 250 of the piston 26, 226 and the inner surface 42, 242 of the valve housing 24, 224.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A bleed valve assembly for a gas turbine engine, the bleed valve assembly comprising, a manifold coupled to a case of a compressor of the gas turbine engine to control a flow of bleed air exiting the compressor, the manifold having an outer surface defining an air passageway formed in the manifold for the bleed air to exit the compressor through the manifold, wherein the air passageway defines a central axis of the bleed valve assembly, a valve housing coupled with the manifold and configured to receive pressurized air, a piston received in the valve housing and configured to move selectively relative to the valve housing and the manifold in response to the valve housing receiving the pressurized air to close the air passageway of the manifold, a valve seal coupled with the manifold and arranged around the air passageway, the valve seal being configured to compress axially between the piston and the outer surface of the manifold in response to the piston moving axially downward to a closed position to provide a seal between the piston and the manifold so that the bleed air is blocked from flowing between the piston and the outer surface of the manifold, and an air collector arranged axially between the valve housing and the manifold to collect the bleed air that exits through the air passageway when the piston is in the open position, wherein the manifold further includes an intermediate surface spaced axially apart from the outer surface and extending radially outward from the outer surface relative to the central axis and an axially-extending wall interconnecting the outer surface and intermediate surface, the valve seal extends along the outer surface, axially along the axially-extending wall, and radially along the intermediate surface so as to be located axially relative to the central axis between the intermediate surface of the manifold and the air collector.

2. The bleed valve assembly of claim 1, wherein the valve seal comprises sheet metal configured to conform to a bottom surface of the piston and the outer surface of the manifold when the piston is in the closed position.

3. The bleed valve assembly of claim 1, wherein the valve seal has a radial length that is greater than a radial length of a bottom surface of the piston.

4. The bleed valve assembly of claim 1, further including at least one fastener that couples the valve housing to the outer surface of the manifold, wherein the at least one fastener extends axially through the air collector, the valve seal, and into the intermediate surface of the manifold.

5. The bleed valve assembly of claim 1, wherein the valve seal is formed to include a raised ridge portion that extends away from at least a portion of the manifold in response to the piston being in the open position and compresses toward the manifold in response to the piston being in the closed position and the piston applying a force to the raised ridge portion.

* * * * *